United States Patent

Ihara

Patent Number: 6,132,544
Date of Patent: *Oct. 17, 2000

[54] PREPARATION OF GOLF BALLS USING RESIN FILM

[75] Inventor: Keisuke Ihara, Chichibu, Japan

[73] Assignee: Bridgestone Sports Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/893,052

[22] Filed: Jul. 14, 1997

Related U.S. Application Data

[63] Continuation of application No. 08/509,095, Aug. 1, 1995, abandoned.

[30] Foreign Application Priority Data

Aug. 9, 1994 [JP] Japan .................................. 6-208005

[51] Int. Cl.[7] .............................. A63B 37/12; B29C 53/46
[52] U.S. Cl. ........................ 156/146; 156/213; 156/220; 156/245; 156/286; 473/371
[58] Field of Search ..................................... 156/146, 285, 156/286, 292, 213, 220, 245; 473/371, 378, 365; 273/DIG. 22

[56] References Cited

U.S. PATENT DOCUMENTS

| | | | |
|---|---|---|---|
| 1,481,866 | 1/1924 | Heist | 156/292 |
| 1,915,587 | 6/1933 | Worthington | 473/365 |
| 1,926,315 | 9/1933 | Smith | 473/365 |
| 2,787,024 | 4/1957 | Smith | 473/378 |
| 2,973,800 | 3/1961 | Muccino | 473/378 |
| 4,501,715 | 2/1985 | Barfield et al. | 264/248 |
| 4,858,924 | 8/1989 | Saito et al. | 273/DIG. 22 |
| 4,938,471 | 7/1990 | Nomura et al. | 473/365 |
| 5,506,004 | 4/1996 | Maruoka et al. | 427/425 |
| 5,749,796 | 5/1998 | Shimosaka et al. | 473/365 |

FOREIGN PATENT DOCUMENTS

| | | | |
|---|---|---|---|
| 2227671 | 8/1990 | United Kingdom | 273/233 |

*Primary Examiner*—Geoffrey L. Knable
*Attorney, Agent, or Firm*—Sughrue, Mion, Zinn, Macpeak & Seas, PLLC

[57] ABSTRACT

A golf ball is prepared by enclosing a ball body with a pair of resin films and heat pressing the resin films to the ball body in a dimpling mold to thereby form a resin layer around the ball body and impress dimples in the resin layer. There is obtained a golf ball of quality having a thin uniform resin layer on the surface.

8 Claims, 3 Drawing Sheets

PREPARATION OF GOLF BALLS USING RESIN FILM

This is a Continuation of application Ser. No. 08/509,095 filed Aug. 1, 1995, now abandoned.

BACKGROUND OF THE INVENTION

1. Field of the Invention

This invention relates to a method for preparing a golf ball by enclosing a ball body, which may be either a single or multi-layer solid core or a wound ball core, with a resin layer. More particularly, it relates to a method for preparing a golf ball of quality which ensures that a very thin resin layer is effectively formed around the ball to a uniform thickness.

2. Prior Art

In general, golf balls are classified into two categories, solid golf balls and wound golf balls. The solid golf balls include one-piece solid golf balls consisting of a single layer, two-piece solid golf balls having a solid core and a cover, and multi-piece solid golf balls having a solid core and a cover at least one of which has a plurality of layers. The wound golf balls have a solid or liquid center, thread rubber wound thereon, and a cover. If desired, these balls on the surface are further coated with a paint layer.

Whether it is of the two- or multi-piece solid golf ball or the wound golf ball, the cover is conventionally formed by an injection molding technique, namely by placing the core in a mold and injection molding a molten resin into the space between the core and the mold cavity. Also as a general rule, the paint layer is formed by spray coating.

Formation of a cover layer by injection molding, however, has several problems. The cover layer as injection molded is not fully uniform. Especially when the cover is a two-layer structure including an outer thin cover resin layer, it is difficult to produce such a thin cover resin layer uniformly by injection molding. More particularly, the core is placed at the center of the mold cavity to define a space between the core and the mold cavity inner surface for forming a cover. However, it is very difficult to maintain a thin and uniform cover-forming space around the core. Depending on the rheology of a molten resin to form a cover, the molten resin cannot fully penetrate to a narrower section of the cover-forming space. The resulting cover resin layer is not fully thin and uniform, but often contains thickness variations and defects such as holes.

The step of spraying and otherwise coating paint to golf balls is generally a finishing treatment at the last stage after dimple embossing. Sometimes, the paint layer can degrade the precision of dimples on the golf ball surface.

SUMMARY OF THE INVENTION

Therefore, an object of the present invention is to provide a novel and improved method for preparing a golf ball of quality by providing a ball body with a thin resin layer as a cover layer so as to avoid any inconvenience like thickness variations and molding defects, ensuring formation of a thin uniform cover resin layer.

According to the present invention, a golf ball is prepared by enclosing a ball body with a resin film, placing the film-enclosed ball body in a dimpling mold, and effecting heat compression molding to thereby form a resin layer around the ball body and concurrently configure dimples in the resin layer.

More particularly, the method of the invention starts with a ball body in the form of a solid core or wound core having a cover thereon. The ball body is enclosed with a resin film and placed in a dimpling mold or a mold defining a cavity having an inverted dimple pattern. Heat compression molding is effected in the mold to form a resin layer around the ball body and at the same time, configure dimples in the resin layer. The resin layer constitutes an (outer) cover layer having a uniform thickness. Even when it is desired to have a very thin cover layer as is the outer layer of a dual-layer cover, the resin layer affords a thin cover layer of uniform thickness.

Since a resin film is provided around a ball body and heat pressed to the ball body in a dimpling mold, the present invention eliminates the criticality to define a narrow uniform cover-forming space between the core and the mold cavity as required in the injection molding of a cover and to control the rheology of molten resin. Then the invention ensures that a thin cover layer is produced to a uniform thickness all around the ball body without giving rise to inconvenience like thickness variation and thinning out.

According to the method of the invention, a very thin resin layer can be uniformly formed on the surface of a ball body. This very thin resin layer can be a finish layer replacing a conventional paint layer. In this embodiment, a loss of precision of dimples as induced by application of a conventional paint layer is eliminated because dimples are formed directly in this resin layer by means of a dimpling mold.

BEST MODE FOR CARRYING OUT THE INVENTION

Figure 1:
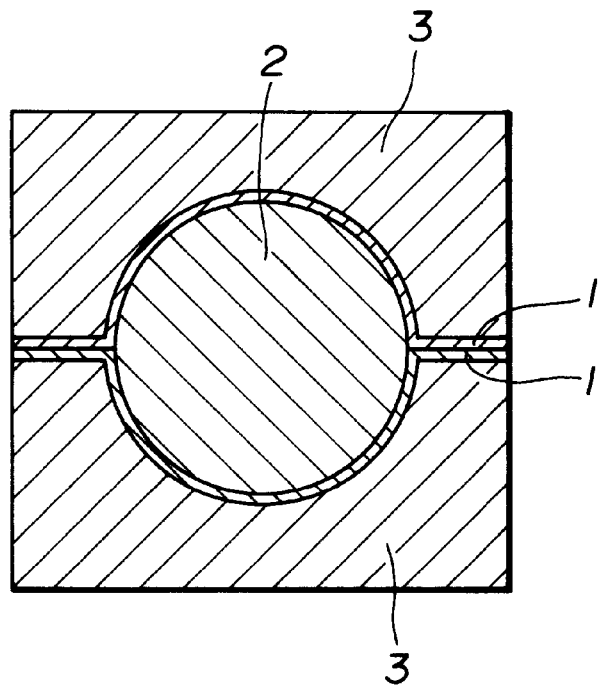
FIG. 1 is a schematic cross-sectional view of a ball in a packing mold in the step of producing a wrapped ball body according to one embodiment of the invention.

Briefly stated, a golf ball is prepared according to the present invention by placing a ball body enclosed with a resin film in a dimpling mold, followed by heat compression molding to thereby form a resin layer and concurrently configure dimples in the resin layer.

The ball body used herein may be either a single or multi-layer solid core or a wound ball core having thread rubber wound on a center. The inventive resin layer may be formed on the surface of the core as a cover layer. In an alternative embodiment wherein the ball body is a solid ball or wound ball having a cover layer, the inventive resin layer is formed on the cover layer as an outer cover layer, constructing a multi-layer cover, typically a dual layer cover. Where the ball body is a one-piece ball, a solid ball having a cover layer or a wound ball, the inventive resin layer may be formed on the surface of the ball body so as to serve as a finish layer replacing a conventional paint layer.

The resin film enclosing the ball body is any desired one of resin films which are heat compression moldable. A proper choice may be made depending on the intended application of the resin layer. For example, ionomer resins, blends thereof, and urethane resins are useful. Where the resin layer is a single cover layer, ionomer resins and blends thereof are preferred. Where the resin layer is a thin layer constituting a multi-layer cover, a choice may be made among urethane resins and ionomer resin blends, especially blends of a soft ionomer resin and a polyester elastomer and blends of a soft ionomer resin and an ethylene-vinyl acetate (EVA) copolymer. Where the resin layer serves as a finish layer replacing a paint layer, ionomer and urethane films are advantageously used.

The gauge of the resin film may be properly selected in accordance with the intended application of the resin layer. Though not critical, the resin film is generally about 10 $\mu$m to 1 mm thick. Especially when the resin layer is an outer layer of a multi-layer cover or a finish layer, the resin film is preferably about 10 to 500 $\mu$m thick, more preferably about 25 to 300 $\mu$m thick.

The materials of which the core and cover of the ball body are made may be conventional materials well known for such purposes. Their manufacturing techniques are also conventional.

According to the present invention, a ball body is enclosed with a resin film and placed in a dimpling mold where the resin film is heat compression molded to thereby form a resin layer and configure dimples in the resin layer. After the ball body is enveloped with the resin film, the filmed ball body can be directly heat pressed in a dimpling mold, thereby closely covering the ball body with the resin film to form a resin layer and configuring dimples in the resin layer. Alternatively and most often, the resin film is heat pressed to the ball body in a packing mold to produce a wrapped ball body in which the ball body is closely covered with the resin film or layer, and then the wrapped ball body is placed in a dimpling mold where the ball is heat molded to configure dimples in the resin layer.

Figure 2:
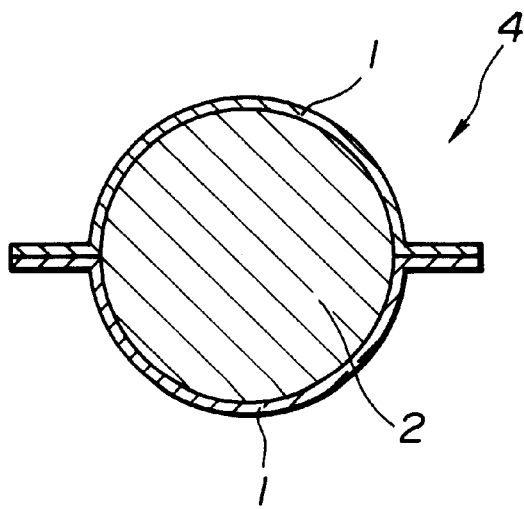
FIG. 2 is a schematic cross-sectional view of the wrapped ball body.

Referring to FIG. 1, a ball body 2 is disposed between a pair of resin films 1 and 1 which are received in a pair of packing mold halves 3 and 3, respectively. Each resin film includes a hemispherical cup section and a flat flange extending radially therefrom. The mold halves are heated and pressed whereby the resin films 1 and 1 are thermally fused to each other along their flanges and at the same time, to the ball body surface. There is obtained a wrapped ball body 4 in which the ball body 2 is closely enclosed or covered with the resin films 1, 1 as shown in FIG. 2.

The step of heat pressing the ball body 2 and resin films 1, 1 in the packing mold 3 is preferably carried out in vacuum to avoid entry of air between the ball body 2 and the resin films 1, 1 and wrinkling of the resin films, ensuring that the ball body is closely enclosed with the resin films.

The heating temperature and pressure used in the step of heat pressing the ball body 2 and resin films 1, 1 between the packing mold halves 3 and 3 are properly determined in accordance with the material and gage of the resin films insofar as a pair of resin films 1, 1 are thermally fused together and closely joined to the ball body 2. For example, where the resin films are of an ionomer resin or a blend thereof, the heating temperature is about 100 to 150° C. The degree of vacuum is also properly determined in accordance with the material and gage of the resin films insofar as the resin films 1, 1 are not wrinkled and brought in close contact with the ball body 2.

Figure 3A:
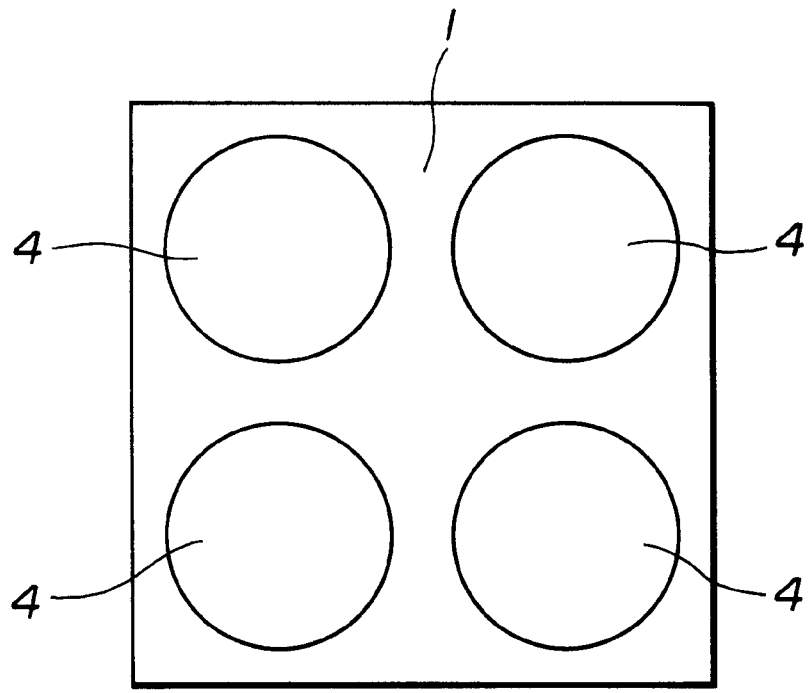
FIG. 3 illustrates wrapped ball bodies obtained midway the method of the invention, FIG. 3A being a plan view and FIG. 3B being a side elevation.
Figure 3B:
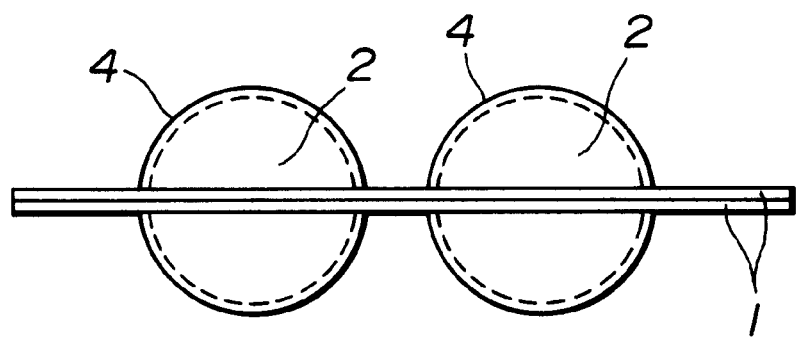

An alternative step of packing the ball body 2 with the resin films 1, 1 is shown in FIG. 3 wherein a plurality of (four in the illustrated embodiment) ball bodies 2 are packed between a pair of resin films 1, 1. Then a plurality of (four in the illustrated embodiment) wrapped ball bodies 4 are produced at the same time, leading to an improved manufacturing efficiency. Also, the ball body 2 can be enclosed with resin films 1 by another method without using the packing mold 3. For example, the ball body 2 can be encircled in resin films 1 by means of a well-known vacuum packing apparatus.

The procedure of placing the ball body and resin films in the packing mold is not critical. In one procedure, the ball body is encircled in a pair of resin films before it is placed in the packing mold. In another procedure, a pair of resin films are set in the packing mold before the ball body is placed in the packing mold so that the ball body is interposed between the opposed resin films.

Next, the wrapped ball body 4 is placed in a dimpling mold or a mold defining a cavity having an inverted dimple pattern. Heat compression molding is carried out again whereby the resin films 1 and 1 form a resin layer around the ball body 2 and at the same time, dimples are configured in the resin layer.

Figure 4:
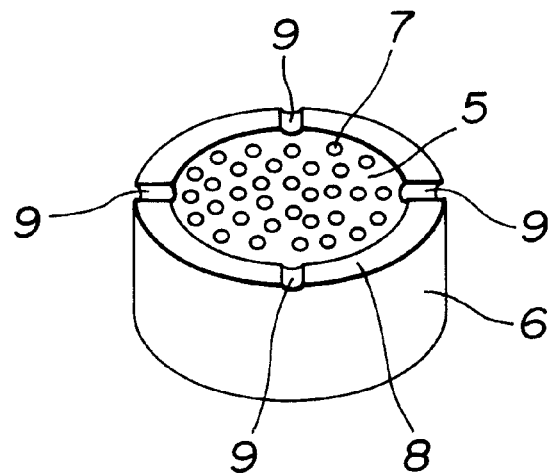
FIG. 4 is a perspective view of an exemplary dimpling mold used in the method of the invention.

One exemplary dimpling mold is shown in FIG. 4 as a pair of mold halves 6 (only one is shown in FIG. 4). Each mold half 6 defines a hemispherical cavity 5 which is provided on the inner surface with a plurality of bosses 7 for forming dimples. The mold half 6 has an annular parting surface 8 where one or more (four in the illustrated embodiment) spews 9 are formed for providing fluid communication between the mold cavity (defined when the mold halves are mated together) and the exterior. During heat pressing, surplus resin can be discharged out of the mold 6 through the spews 9, ensuring formation of the resin layer and dimples therein.

The heating temperature and pressure used in the step of heat pressing the wrapped ball body 4 in the mold 6 are properly determined in accordance with the material and gauge of the resin films. For example, where the resin films are of an ionomer resin or a blend thereof, the heating temperature is about 130 to 170° C. and the pressure is about 80 to 200 kg/cm$^2$.

In another embodiment of the invention, a ball body is placed between a pair of resin films and the ball body with the resin films thereon is directly placed in a dimpling mold where heat pressing is done to form a resin layer and concurrently configure dimples in the resin layer. This embodiment eliminates the packing step of heat pressing the ball body with the resin films thereon in a packing mold to form a wrapped ball body, ensuring efficient manufacture of golf balls.

Like the packing procedure, the procedure of placing the ball body and resin films in the dimpling mold is not critical. In one procedure, the ball body is encircled in a pair of resin films before it is placed in the dimpling mold. In another procedure, a pair of resin films are set in the dimpling mold before the ball body is placed in the dimpling mold so that the ball body is interposed between the opposed resin films.

Figure 5:
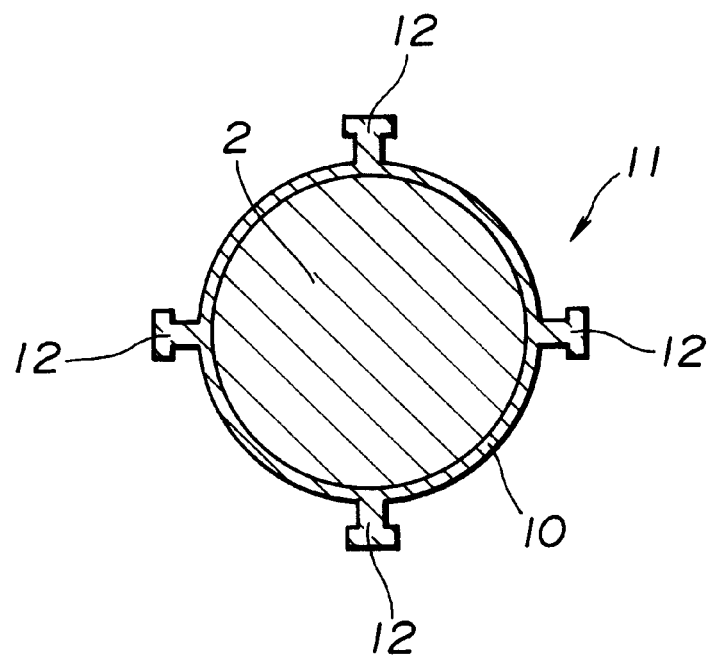
FIG. 5 is a cross-sectional view of a golf ball on which a resin layer is formed using the mold of FIG. 4, prior to trimming.

In either of the embodiments, the wrapped ball body 4 or the ball body 2 enveloped in a pair of resin films is heat pressed in the dimpling mold 6, thereby press molding the resin films to form a resin layer 10 of a predetermined thickness closely fused to the surface of the ball body 2 as shown in FIG. 5 and at the same time, configuring dimples (not shown) in the resin layer 10 in conformity with the bosses 7 of the mold 6. The thickness of the resin layer 10 is properly determined so as to meet the role of the resin layer 10.

Heat pressing in the dimpling mold 6 produces a ball 11 having fins 12 as shown in FIG. 5 (four fins in the figure). The fins 12 are of the surplus resin which has been forced out of the mold 6 through the spews 9 during heat pressing. Though not shown, burrs are left along the parting line as usual. These fins and burrs are trimmed, finishing the golf ball.

In this way, there is obtained a golf ball having the resin layer 10 around the ball body 2. Where the resin layer 10 is a cover layer, conventional finishing treatment including paint coating is applied to the ball if necessary. Where the resin layer 10 is a finish layer (like paint coat), the ball is complete at this stage.

According to the method of the invention, a golf ball having a thin resin layer as a cover layer can be produced because a thin resin layer can be formed to a uniform thickness without thickness variations and molding defects. A very thin uniform resin layer capable of replacing a conventional paint layer can be formed on the ball surface without degrading the precision of dimples.

EXAMPLE

Examples of the present invention are given below by way of illustration and not by way of limitation.

A liquid center was prepared by molding a natural rubber (NR) composition in a hemispherical mold cavity and vulcanizing it to form hollow hemispherical shells having a thickness of 2.2 mm and a hardness of 60 on JIS A scale. A pair of shells were mated to form a rubber bag which was filled with water containing 4% by weight of an anti-freeze agent. The center ball had an outer diameter of 28 mm and a weight of 17 g. The weight of the liquid was 6.1 g.

Thread rubber (polyisoprene) of 0.55 mm thick and 1.5 mm wide was wound on the center ball by a conventional winding technique to form a thread rubber layer of 5.2 mm thick. The resulting wound core had a weight of 34.4 g.

A cover composition was prepared by blending 100 parts by weight of a zinc ionomer resin with 5 parts by weight of titanium oxide and 0.3 parts by weight of magnesium stearate in a twin screw extruder. The cover composition was molded into hemispherical cups. A pair of cups were mated so as to enclose the wound core therein and compression molded to form a cover having a Shore D hardness of 63, obtaining a ball body.

The ball body was disposed between a pair of resin films of the type and gage shown in Table 1, placed in a packing mold, and heat pressed under the packing condition shown in Table 1, obtaining a wrapped ball body as shown in FIG. 2.

TABLE 1

| Film | | |
| --- | --- | --- |
| Type | Gage ($\mu$m) | Packing temp. (° C.) |
| Himilan 1601 | 25 | 140 |
|  | 50 | 140 |
|  | 150 | 140 |
| Himilan 1652 | 25 | 112 |
|  | 50 | 130 |
|  | 150 | 130 |
| Himilan 1705 | 25 | 140 |
|  | 50 | 140 |
|  | 150 | 140 |

TABLE 1-continued

| Film | | |
| --- | --- | --- |
| Type | Gage ($\mu$m) | Packing temp. (° C.) |
| Himilan 1707 | 25 | 140 |
|  | 50 | 140 |
|  | 150 | 140 |
| Himilan 1855 | 25 | 140 |
|  | 50 | 140 |
|  | 150 | 140 |
| Himilan 1707 | 300 | 140 |

Himilan ionomer resins are commercially available from Mitsui-dePont Chemical K.K.

The wrapped ball body was placed in a dimpling mold as shown in FIG. 4 and heat pressed at 160° C. and 120 kg/cm². The resulting ball was taken out of the mold and trimmed of the fins associated with spews and the burrs along the parting line, completing a golf ball.

All the thus obtained golf balls had a uniform resin layer as their outermost layer.

Japanese Patent Application No. 208005/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A method for preparing a solid golf ball comprising the steps of:

disposing a ball body between a pair of resin films each having a gauge of 10 $\mu$m to less than 300 $\mu$m, wherein said ball body has a single or multi-layer solid core which may have a cover thereon;

heat pressing in vacuum the resin films to the ball body in a packing mold to form a wrapped ball body in which the ball is closely wrapped with the resin film; and heat pressing the wrapped ball body in a dimpling mold to thereby form a resin layer around the ball body and to concurrently emboss dimples in the resin layer, wherein said method for preparing a solid golf ball does not comprise a step of coating the embossed golf ball with paint.

2. The method according to claim 1, wherein the dimpling mold defines a cavity and has a spew for providing fluid communication between the cavity and the exterior whereby surplus resin is discharged through the spew in the step of heat pressing the resin films in the mold.

3. The method according to claim 1, wherein the pair of resin films each have a gauge of 10 $\mu$m to 150 $\mu$m.

4. The method according to claim 3, wherein the pair of resin films each have a gauge of 25 $\mu$m to 150 $\mu$m.

5. A method for preparing a wound golf ball comprising the steps of:

compression molding a wound ball core enclosed in a pair of hemispherical cups of a cover composition to obtain a ball body;

disposing the ball body between a pair of resin films each have a gauge of 10 $\mu$m to less than 300 $\mu$m heat pressing in vacuum the resin films to the ball body in a packing mold to form a wrapped ball body in which the ball is closely wrapped with the resin film; and heat pressing the wrapped ball body in a dimpling mold to thereby form a resin layer around the ball body and to concurrently emboss dimples in the resin layer, wherein said method for preparing a solid golf ball does not comprise a step of coating the embossed golf ball with paint.

6. The method according to claim 5, wherein the dimpling mold defines a cavity and has a spew for providing fluid communication between the cavity and the exterior whereby surplus resin is discharged through the spew in the step of heat pressing the resin films in the mold.

7. The method according to claim 5, wherein the pair of resin films each have a gauge of 10 $\mu$m to 150 $\mu$m.

8. The method according to claim 7, wherein the pair of resin films each have a gauge of 25 $\mu$m to 150 $\mu$m.

* * * * *